United States Patent [19]

Yamauchi et al.

[11] Patent Number: 5,976,587
[45] Date of Patent: Nov. 2, 1999

[54] MAYONNAISE BASE AND METHOD FOR PRODUCING IT

[75] Inventors: Takashi Yamauchi, Aichi; Hiroko Mikuni, Tokyo, both of Japan

[73] Assignee: Morita Co., Ltd., Nagoya, Japan

[21] Appl. No.: 09/029,095

[22] PCT Filed: Jul. 3, 1997

[86] PCT No.: PCT/JP97/02298

§ 371 Date: Feb. 18, 1998

§ 102(e) Date: Feb. 18, 1998

[87] PCT Pub. No.: WO99/01042

PCT Pub. Date: Jan. 14, 1999

[51] Int. Cl.$^6$ .................................................. A23D 9/02
[52] U.S. Cl. .................... 426/112; 426/601; 426/602; 426/605; 426/404
[58] Field of Search ................................ 426/605, 601, 426/602, 112, 404

[56] References Cited

U.S. PATENT DOCUMENTS

| | | | |
|---|---|---|---|
| 2,844,469 | 7/1958 | Melnick | 426/602 |
| 3,764,347 | 10/1973 | Katz | 426/602 |
| 4,304,795 | 12/1981 | Takada | 426/602 |
| 4,426,395 | 1/1984 | Sakai | 426/605 |
| 4,562,086 | 12/1985 | Smoka | 426/605 |
| 4,948,617 | 8/1990 | Dartey | 426/602 |
| 5,114,733 | 5/1992 | Quinet | 426/604 |
| 5,137,742 | 8/1992 | Bakal | 426/605 |
| 5,614,243 | 3/1997 | Dunn | 426/605 |
| 5,641,533 | 6/1997 | Pederson | 426/605 |
| 5,837,308 | 11/1998 | Campbell | 426/602 |

FOREIGN PATENT DOCUMENTS 48-36373  5/1973  Japan .

OTHER PUBLICATIONS

Griswold 1962 The experimental study of Foods Houghton Mifflin Co Boston p 262–263.

*Primary Examiner*—Carolyn Paden
*Attorney, Agent, or Firm*—Armstrong, Westerman, Hattori, McLeland & Naughton

[57] ABSTRACT

Disclosed is a mayonnaise base which is mixed with eggs by consumers to give mayonnaise. The mayonnaise base consists indispensably of vegetable oil, vinegar and emulsifier (except egg yolk) along with other seasonings (except vinegar) and spices, and is stored in an oxygen-free container. The mayonnaise base is mixed with fresh eggs by consumers to give mayonnaise with ease. In accordance with the consumers' request, either whole eggs or only egg yolk or albumen can be added to the mayonnaise base.

9 Claims, 2 Drawing Sheets

MAYONNAISE BASE AND METHOD FOR PRODUCING IT

BACKGROUND ART

The present invention relates to a novel mayonnaise base and a method for producing it.

The flowchart of FIG. 1 shows one typical example of the conventional production of mayonnaise, which is as follows:

Vinegar (suitably diluted with water) and egg yolk (emulsifier) are, while being stirred, mixed with seasonings and spices (these are generally soluble in water), to which is added vegetable oil (salad oil) and further stirred to give an oil/water (o/w) emulsion.

However, this method is complicated, as comprising many steps.

In addition, in this method, since egg yolk is used as the emulsifier, the worsening of the flavor of the product, mayonnaise is inevitable due to the deterioration of the egg yolk, even though the product, mayonnaise is stored in a sealed container.

In order to solve the latter problem, homemade mayonnaise is the most desirable. However, homemaking of mayonnaise is also complicated like its industrial-scale production as above.

Accordingly, for example, a mayonnaise base has been proposed in Japanese Patent Application Laid-Open No. 48-36373. Using the mayonnaise base, one can produce homemade mayonnaise with ease.

The mayonnaise base is produced by mixing 4 g of mustard paste in 4 g of water with 1 g of vinegar, 1.4 g of white oil extract, 2.4 g of edible salt, 6.6 g of sugar and 0.6 g of glutamic acid in that order with stirring, and it contains spices and seasonings which are additives to mayonnaise.

Using the mayonnaise base, mayonnaise is produced as follows:

The mayonnaise base is put into a cylindrical container, to which are added one egg yolk and 15 cc of vinegar. These are stirred in the vertical direction to give a fine-grained mixture, which is further stirred in the vertical direction with dripping thereto 90 cc of salad oil through the space between the bottom hole of the concave cap and the stirring rod to give a creamy paste. Then, 7.5 cc of vinegar is added to the paste, and further stirred in the same manner as above with dripping thereto 90 cc of salad oil. Thus is obtained mayonnaise.

However, though not requiring the addition of the additives, seasonings and spices, this method is also troublesome in that it requires the addition of egg yolk and the addition of vinegar and salad oil which must be weighed accurately and that the latter addition must be effected in two stages. In addition, this method requires a special stirrer (for example, equipped with a rotatable net) for stirring the ingredients. As compared with the conventional production of homemade mayonnaise, the use of the mayonnaise base is not so advantageous though not requiring the addition of seasonings and spices to the base.

DISCLOSURE OF THE INVENTION

Given the situation as above, it is an object of the present invention to provide a mayonnaise base, with which is easily produced fresh homemade mayonnaise without requiring the addition thereto of weighed vinegar and salad oil and without requiring any special stirrer.

Another object of the invention is to provide a method for producing the mayonnaise base, which is much easier than any other conventional methods for producing mayonnaise in industrial lines.

Having the constitution mentioned below, the mayonnaise base of the invention has solved the problems in the prior art as above.

The mayonnaise base of the invention is stirred with eggs by consumers to give mayonnaise, and is characterized in that it consists indispensably of vegetable oil, vinegar and emulsifier along with other seasonings and spices, and is stored in an oxygen-free container.

Preferably, the mayonnaise base is stored in a wide-mouth bottle in such an amount that corresponds to one egg for giving mayonnaise, and the size of the wide-mouth bottle is such that the bottle thus filled with the mayonnaise base corresponding to one egg still has at least an empty space that corresponds to about one egg. Using the bottle filled with the mayonnaise base in that condition, it is more easy to produce homemade mayonnaise.

Also preferably, the mayonnaise base contains a combination of a nonionic surfactant as the emulsifier and xanthane gum and gelatinized starch as the emulsion stabilizer thickener. Containing those, the storage stability of the fresh mayonnaise base is improved, and in addition, the mayonnaise base is more easily mixed with eggs to give mayonnaise.

The use of eggs (egg yolk) as the emulsifier for mayonnaise is the fixed knowledge of those skilled in the field of mayonnaise production. Anyone skilled in the art has considered that egg yolk could not be emulsified with a mixture comprising salad oil and an aqueous component of seasoned vinegar. Therefore, the technical idea of adding eggs to a mayonnaise base just before using the thus-formed mayonnaise is beyond the common sense of those skilled in the art. We, the present inventors have found that, when a mayonnaise base is pre-emulsified with a hardly-deteriorating emulsifier for food, then it can be formed into mayonnaise by adding eggs thereto just before using the thus-formed mayonnaise. Our finding is just a tradition of so-called Columbus' egg that Columbus stood a raw egg on its end on the table after having slightly cracked the end. On the basis of this our finding, we have completed the present invention.

BEST MODES OF CARRYING OUT THE INVENTION

Figure 2:
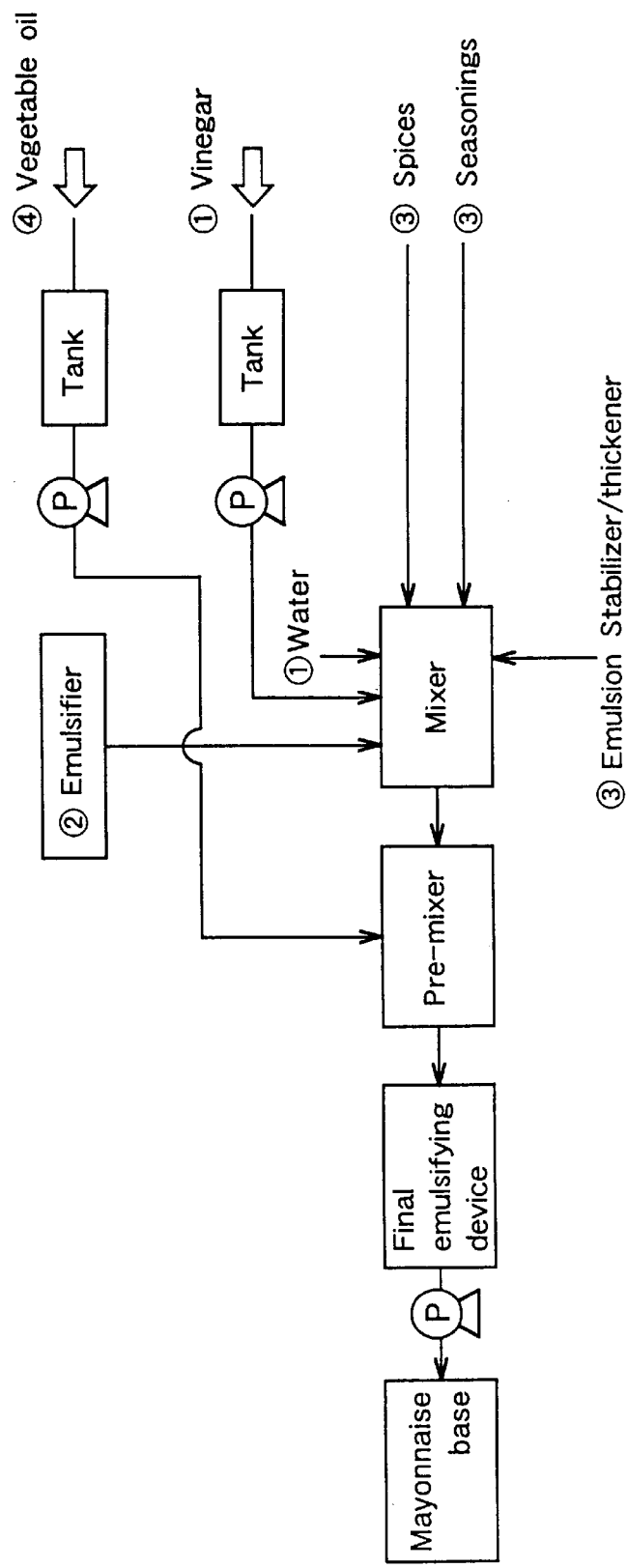
FIG. 2 is a flowchart showing one embodiment of a method for producing the mayonnaise base of the invention.

Now, one embodiment of the invention is described hereinunder with reference to the drawing of FIG. 2. Unless otherwise specifically indicated, "parts" referred to hereinunder are "parts by weight".

Also unless otherwise specifically indicated, the static viscosity as referred to herein was measured with a B-type viscometer using a No. 6 rotor at 2 rpm at 20° C.

(1) The mayonnaise base of the invention is formed into mayonnaise by a consumer who adds thereto eggs and stirs them, and is characterized in that it consists indispensably of vegetable oil, vinegar and emulsifier along with other seasonings and spices and is stored in an oxygen-free container.

The vegetable oil includes, for example, safflower oil, rape oil, soybean oil, corn oil, cotton seed oil, olive oil, and white oil extract (essential oil) from those oils. Preferred is white oil extract from safflower oil or rape oil, which is generally referred to as salad oil.

The vinegar includes, for example, polished rice vinegar, unpolished rice vinegar, vinegar from other cereals, sake lees vinegar, alcohol vinegar, apple vinegar and grape vinegar, which can be used either singly or as combined. However, the vinegar is preferably based on apple vinegar and rice vinegar. The acid degree of the vinegar may be from 4.5 to 10%, preferably from 4.5 to 5.5%.

The emulsifier is not specifically defined, provided that it is accepted as an additive to food. However, in order to obtain the mayonnaise base as an o/w emulsion, the emulsifier is preferably a nonionic surfactant generally having an HLB (hydrophilic-lipophilic-balance) value of from 8 to 18, preferably from 10 to 13, more preferably about 11. Using such a nonionic surfactant as the emulsifier, it is easy to obtain the mayonnaise base as an o/w emulsion. Two different components may be combined to give a two-component emulsifier having an HLB value falling within the defined range.

The nonionic surfactant satisfying the above-mentioned requirement includes, for example, alkylpolyoxyethylene ethers, alkylcarbonyloxy-polyoxyethylenes, esters of fatty acids with polyalcohols, fatty acid-polyalcohol-polyoxyethylenes, and esters of fatty acids with sucrose (see "Handbook of Chemistry", Application Section, 3rd Revision, edited by the Chemical Society of Japan, published by Maruzen Co. on Mar. 15, 1980, page 968).

One embodiment of the two-component emulsifier is comprised of a polyglycol ester surfactant and lecithin (phosphatidyl choline).

The basic composition of the mayonnaise base of the invention comprises 100 parts by weight of vegetable oil, from 5 to 50 parts by weight of vinegar, and from 0.5 to 5 parts by weight of emulsifier.

The seasonings include, for example, edible salt, sugar and other various sweeteners, soy sauce, mirin (sweet sake), sodium glutamate, amino acids, and various soup stocks.

The spices include, for example, mustard, pepper, lemon. juice, and other flavorings.

(2) In addition to those indispensable ingredients mentioned above, the mayonnaise base may further contain emulsion stabilizer/thickener. When lightly stirred with eggs, the mayonnaise base gives delicious mayonnaise with suitable viscosity, even though any other seasonings are not added thereto. The suitable viscosity may be from 30 to 200 Pa.s (from 30,000 to 200,000 cps), preferably from 70 to 140 Pa.s (from 70,000 to 140,000 cps), more preferably from 90 to 110 Pa.s (from 90,000 to 110,000 cps) in terms of the static viscosity at 20° C. When mixed with eggs, the viscosity of the mayonnaise base is generally lowered. Therefore, it is desirable that the mayonnaise base has a viscosity higher than the intended viscosity of the mayonnaise to be formed by adding eggs to the mayonnaise base, by from 30,000 to 50,000 Pa.s (cps).

As the emulsion stabilizer/thickener, used is natural gum. The natural gum includes, for example, corn starch, guar gum, locust bean gum, rice starch (these are seed gums); potato starch, arrowroot starch (these are tuber and rhizome gums); algin, carrageenan, agar (these are seaweed extracts); pectin (this is an plant extract); arabic gum (this is a secreted gum); xanthane, dextran (these are fermented gums); carboxymethyl cellulose, hydroxyalkylmethyl cellulose, methyl cellulose, starch phosphate, hydroxyethylated starch, hydroxypropylated starch, oxidized starch, dextrinated starch (these are processed gums); and even cellulose (see "Maruzen Polymer Encyclopedia" translated by T. Mita, published by Maruzen on Sep. 20, 1994, page 238). Of those, preferred is a combination of xanthane and gelatinized ($\alpha$-)starch, as favorably controlling and stabilizing the viscosity of the mayonnaise base. In addition, the mayonnaise base containing the combination of the two gives more delicious mayonnaise, when mixed with eggs. The degree of gelatinization of the gelatinized starch may be 95% or more, preferably 98% or more.

The ratio of xanthane to $\alpha$-starch, xanthene/$\alpha$-starch, may be from 1/9 to 5/5, preferably from 3/7 to 4/6.

Now, one example of the composition of the mayonnaise base of the invention is mentioned below. This had a static viscosity of 14 Pa.s (14,000 cps), and gave mayonnaise having a static viscosity of 10 Pa.s (10,000 cps) when mixed with eggs.

| | |
|---|---|
| Vegetable oil (safflower oil) | 70 parts |
| Vinegar (apple vinegar) | 15 parts |
| Water | 8.5 parts |
| Sodium glutamate | 0.2 parts |
| Edible salt | 2 parts |
| Sugar | 0.2 parts |
| Lemon juice | 0.5 parts |
| Pepper | 0.4 parts |
| Mustard | 1.5 parts |
| Soy sauce | 0.1 parts |
| Emulsifier(*) | 1 part |
| Xanthane gum | 0.1 parts |
| Gelatinized starch | 0.5 parts |
| Total | 100 parts |

(3) A method for producing the mayonnaise base having the composition mentioned above comprises the following steps, for which referred to is FIG. 2.

<1> Water and vinegar are mixed and heated, in which xanthane is then dissolved.

<2> After the mixture of <1> has been heated at 60 to 70° C., emulsifier is added thereto.

<3> The other ingredients except vegetable oil are added to the mixture of <2>, stirred, and dissolved therein.

<4> With stirring, vegetable oil is added to the mixture of <3> and emulsified therein.

(4) The mayonnaise base thus produced in the manner mentioned above is put into 200-ml, wide-mouth bottles in an amount of 100 ml/bottle. One egg may be added to the mayonnaise base in each bottle, and mixed to give mayonnaise.

The empty space of 100 ml of each bottle corresponds to one egg, in which one egg added to the bottle can be well mixed with the mayonnaise base to give mayonnaise. In general, the empty space is filled with nitrogen in order to protect the mayonnaise base from being deteriorated.

(5) The mayonnaise base thus produced can be used, for example, as follows:

Merely mixing the mayonnaise base with eggs with lightly stirring them with a spoon or chopsticks, anyone can produce fresh and delicious homemade mayonnaise without adding thereto weighed vinegar and salad oil and without using any special stirrer. In accordance with the consumers' request, either whole eggs or only egg yolk or albumen may be added to the mayonnaise base.

Figure 1:
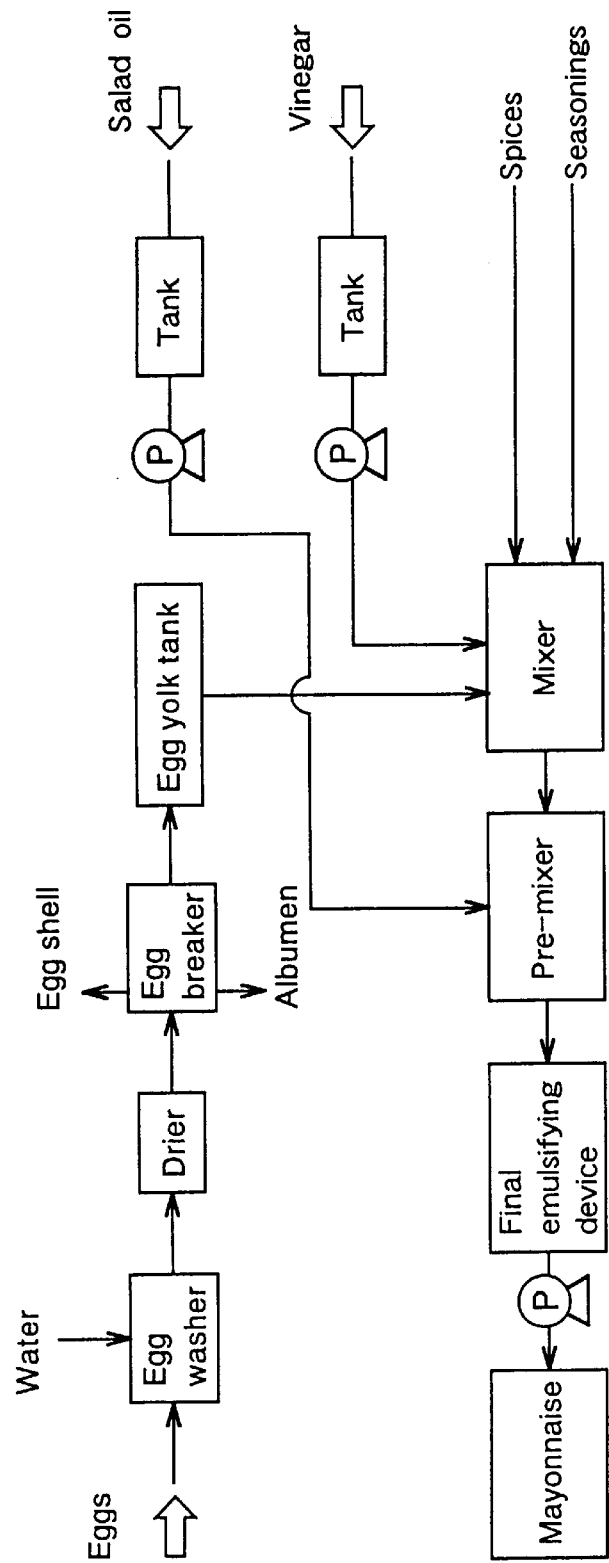
FIG. 1 is a flowchart showing a conventional method for producing mayonnaise.

The method for producing the mayonnaise base of the invention is, as shown in FIG. 2 and as compared with the conventional method for producing mayonnaise shown in FIG. 1, significantly simplified in industrial-scale production lines.

The bottled mayonnaise base of the composition as produced according to the method mentioned above was, after having been stored at 37° C. for 3 months, did not deteriorated at all with respect to both its taste and its color.

We claim:

1. A mayonnaise pre-mix comprising a mayonnaise base held in a container, wherein said mayonnaise base comprises 100 parts by weight of vegetable oil, from 5 to 50 parts by weight of vinegar and from 0.5 to 5 parts by weight of emulsifier other than egg yolk along with spices, seasonings other than vinegar, or both spices and seasonings other than vinegar, and does not contain egg yolk, said mayonnaise base is stored in said container in an oxygen-free environment, and said mayonnaise base is stirred with eggs by consumer to yield mayonnaise.

2. The mayonnaise pre-mix as claimed in claim 1, wherein the container is a wide-mouth bottle and the amount of said mayonnaise base in said bottle is such that mayonnaise can be obtained by addition of one egg to said mayonnaise base, the size of the wide-mouth bottle being such that the bottle thus filled with the mayonnaise base in said amount such that mayonnaise can be obtained by addition of one egg still has at least an empty space that corresponds to the volume of about one egg.

3. The mayonnaise pre-mix as claimed in claim 1, wherein the emulsifier is a nonionic surfactant.

4. The mayonnaise pre-mix as claimed in claim 1, wherein said mayonnaise base further comprises xanthane gum and gelatinized starch as emulsion stabilizer/thickener.

5. The mayonnaise pre-mix as claimed in claim 1, said mayonnaise base comprising from 0.001 to 0.005 parts by weight of xanthane gum, and from 0.001 to 0.01 parts by weight of gelatinized starch.

6. The mayonnaise pre-mix as claimed in claim 1, wherein the mayonnaise base comprises 100 parts by weight of vegetable oil and 5 to about 22 parts by weight of vinegar.

7. A method for producing a mayonnaise pre-mix, comprising adding emulsion stabilizer or thickener, or both emulsion stabilizer and thickener, to from 5 to 50 parts by weight of vinegar, heating them while stirring, adding from 0.5 to 5 parts by weight of emulsifier other than egg yolk thereto while still stirring, adding thereto other seasonings and spices while still stirring, adding thereto 100 parts by weight of vegetable oil, emulsifying the resulting mixture, putting the resulting emulsion in a container without adding egg yolk, and sealing the container in an oxygen-free condition to form the mayonnaise pre-mix of claim 1.

8. The method of claim 7, wherein water is added to the mixture of vinegar and emulsion stabilizer or thickener, or both stabilizer and thickener.

9. The method of claim 7, wherein the amount of vinegar added is from 5 to about 22 parts by weight.

* * * * *